United States Patent [19]

Binder et al.

[11] Patent Number: 5,069,682
[45] Date of Patent: Dec. 3, 1991

[54] COLOR-STABLE BETA-MODIFICATION OF A MONOAZO DYE, A PROCESS FOR ITS PREPARATION, AND ITS USE

[75] Inventors: Rudolf Binder, Maintal; Friedrich Schophoff; Klaus Hofmann, both of Frankfurt am Main, all of Fed. Rep. of Germany

[73] Assignee: Cassella Aktiengesellschaft, Frankfurt am Main, Fed. Rep. of Germany

[21] Appl. No.: 631,900

[22] Filed: Dec. 21, 1990

[30] Foreign Application Priority Data

Jan. 10, 1990 [DE] Fed. Rep. of Germany ....... 4000529

[51] Int. Cl.$^5$ ................. C09B 67/02; C09B 67/48; D06P 1/18
[52] U.S. Cl. ........................... 8/526; 8/532; 8/662; 8/922; 534/575
[58] Field of Search ..................... 8/526, 662

[56] References Cited

U.S. PATENT DOCUMENTS

| | | | |
|---|---|---|---|
| 2,007,382 | 7/1935 | Ockman et al. | 8/526 |
| 3,905,951 | 9/1975 | Berrie et al. | 534/772 |
| 4,083,849 | 4/1978 | Quadbeck-Seeser | 546/288 |
| 4,319,880 | 3/1982 | Opitz et al. | 8/526 |
| 4,327,999 | 5/1982 | Koller et al. | 8/526 |
| 4,329,144 | 5/1982 | Eugster et al. | 8/526 |
| 4,332,588 | 6/1982 | Eugster et al. | 8/526 |
| 4,374,640 | 2/1983 | Tappe et al. | 8/526 |
| 4,453,944 | 6/1984 | Liechti et al. | 8/526 |
| 4,460,375 | 7/1984 | Sommer et al. | 8/526 |
| 4,722,737 | 2/1988 | Brandt et al. | 8/526 |
| 4,826,505 | 5/1989 | Nishikuri et al. | 8/688 |
| 4,921,505 | 5/1990 | Effenberger et al. | 8/526 |
| 4,960,435 | 10/1990 | Tunoda et al. | 8/526 |

FOREIGN PATENT DOCUMENTS

| | | |
|---|---|---|
| 0187916 | 7/1986 | European Pat. Off. . |
| 2735376 | 3/1978 | Fed. Rep. of Germany . |
| 3447117 | 6/1986 | Fed. Rep. of Germany . |
| 644621 | 8/1984 | Switzerland . |
| 2054632 | 2/1981 | United Kingdom . |

*Primary Examiner*—A. Lionel Clingman
*Attorney, Agent, or Firm*—Connolly & Hutz

[57] ABSTRACT

The present invention relates to the β-modification of the dye of the formula I

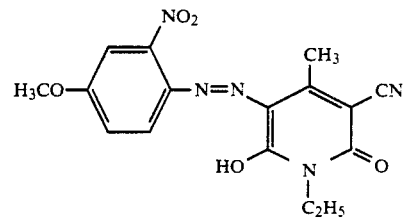

to a process for its preparation, to its use, and to a dye preparation containing it.

8 Claims, No Drawings

COLOR-STABLE BETA-MODIFICATION OF A MONOAZO DYE, A PROCESS FOR ITS PREPARATION, AND ITS USE

The invention relates to the colour-stable $\beta$-modification of the dye of the formula I

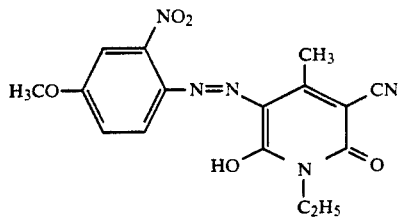

whose X-ray diffraction diagram (Cu-K$\alpha$ radiation) has the following lines at diffraction angles 2$\Theta$ (°):

| | |
|---|---|
| Lines of high intensity: | 11.57, 24.93, 28.09; |
| Lines of medium intensity: | 8.23, 15.52, 18.85, 20.27; |
| Lines of low intensity: | 13.99, 19.35, 21.45. |

The invention furthermore relates to a process for the preparation of the colour-stable $\beta$-modification of the dye of the formula I, to their use for the dyeing and printing of shaped articles and to dye preparations containing the $\beta$-modification of the dye of the formula I.

According to the prior art, the dye of the formula I is prepared, as described in German Federal Patent 1,932,806, by diazotising 4-methoxy-2-nitroaniline and coupling the product onto 1-ethyl-3-cyano-4-methyl-6-hydroxypyrid-2-one in aqueous solution. After the coupling reaction is complete, the precipitated dye is isolated by filtration, washed with water and dried.

The disadvantage of this process, in which the $\alpha$-modification is formed, is that the resulting paste takes a relatively long time to filter and contains at most 30% by weight of the dye, i.e. it results in an unfavourable space-time yield.

This $\alpha$-modification of the dye of the formula I has an X-ray diffraction diagram (Cu-K$\alpha$ radiation) which has the following lines at diffraction angles 2 $\Theta$(°):

| | |
|---|---|
| Lines of high intensity: | 11.38, 26.87; |
| Lines of medium intensity: | 7.60, 8.30, 17.26, 17.88, 27.86; |
| Lines of low intensity: | 14.49, 15.28, 18.92; |

The lines of the X-ray diffraction diagram mentioned for the colour-stable $\beta$-modification, the colour-unstable $\alpha$-modification and the $\gamma$- and $\delta$-modifications of the dye I mentioned below were recorded by a computer-controlled powder diffractometer from Siemens, Diffrac 11 type, using copper-K$\alpha$ radiation ($\lambda = 1.54060$, cathode voltage 40 KV, cathode current 32 mA).

The $\beta$-modification according to the invention of the dye of the formula I is prepared by heating the $\alpha$-modifications to temperatures from 50° to 150° C. They are preferably heated to 60° to 140° C., particularly preferably to 70° to 120° C., which may be done at atmospheric pressure or even at superatmospheric pressure.

The $\alpha$-modification is preferably heated to the temperatures mentioned while suspended in water.

If necessary, dispersants and/or emulsifiers and/or solvents are added to the suspension to be heated. If the temperatures to which the suspension is heated are above the boiling point of the liquid phase, it is necessary to use superatmospheric pressure. Heating is continued until the $\alpha$-modification has been completely converted into the $\beta$-modification, which, as a rule, takes 10 minutes to 10 hours. The conversion can be monitored by X-ray diffraction or microscopic viewing of sample specimens.

Examples of suitable dispersants are condensation products of naphthalenesulphonic acid with formaldehyde or of phenol with formaldehyde and sodium bisulphite, lignosulphonates or sulphite cellulose waste liquor or other anionic or nonionic surface-active compounds. Examples of suitable nonionic dispersants are reaction products of alkylene oxides, such as, for example, ethylene oxide or propylene oxide with alkylatable compounds, such as, for example, fatty alcohols, fatty acids, phenols, alkylphenols or carboxamides. Examples of further anion-active dispersants are alkyl or alkylaryl sulphonates or alkylaryl polyglycol ether sulphates.

The dispersant or a mixture of dispersants is preferably used in an amount of 0.1 to 30% by weight, in particular 0.2 to 10% by weight, relative to the amount of dye.

Examples of suitable solvents are ketones, such as methyl ethyl ketone, or alcohols, such as, for example, ethanol, n-propanol, i-propanol, n-butanol, i-butanol, sec.-butanol, tert.-butanol, pentanols or glycols, in particular diethylene glycol, or chlorinated hydrocarbons, in particular chlorobenzene.

The suspension which is formed in the synthesis of the dye by diazotisation and coupling, after the coupling reaction is completed, is particularly preferably used directly as aqueous suspension. In this case, the dispersant can already be present during the coupling, for example it can have been initially introduced together with the coupling component.

The dye of the formula I in the $\beta$-modification prepared as described by diazotisation, coupling and heating can be filtered quickly, i.e. the filtration time is, as a rule, shorter than that of the $\alpha$-modification by a factor of 15. Moreover, the paste has a dye content of up to 65% by weight. This means that the space-time yield is substantially improved.

The heating can also take place in the course of the customary conversion of the dye into a very finely divided form. For this purpose, the colour-unstable $\alpha$-modification is subjected to shear forces while wet, preferably with the addition of nonionic or anion-active dispersants, of which examples have already been mentioned, and, if necessary, other conventional additives (such as, for example, dust-proofing agents, antifreeze, wetting agents, anti-desiccants and the like), in conventional apparatuses, such as, for example, mills or kneaders, and thereby converted into a finely disperse form. Examples of suitable mills are ball, vibrating, pearl and sand mills. If the conversion of the dye into a finely disperse form is carried out at the temperatures mentioned from 50° to 150° C., preferably 80° to 140° C., very particularly preferably 90° to 120° C., the colour-unstable $\alpha$-modification of the dye of the formula I is at the same time also converted into the colour-stable $\beta$-modification of the dye of the formula I.

During the conversion into a finely divided form, the dye particles are comminuted mechanically to such a degree that an optimum specific surface area is reached and sedimentation of the dye particles is minimised. The dye particle size is in general about 0.1 to 10 μm.

If the dye of the formula I has already been converted into the β-modification at an earlier stage, conversion into a very finely divided form is carried out in the usual manner before application. The present invention also relates to the dye preparations thus obtained. They have a dye content of 15 to 40% by weight, preferably 20 to 30% by weight. For certain areas of application, powder formulations are preferred. These powders contain the dye, dispersants and other auxiliaries, such as, for example, wetting and oxidising agents, preservatives and dust-removing agents. Powdered dye preparations preferably contain 20 to 45% by weight of dispersants.

A particularly preferred preparation process for powdered dye preparations consists in removing the liquid from the liquid dye preparations described above, for example by vacuum-drying, freeze-drying, by drying on drum dryers, but preferably by spray-drying.

If the dye of the formula I is prepared by the process of so-called inverse coupling, i.e. the coupling solution is run into the diazonium salt solution with stirring, during which the coupling temperature is maintained in the range from about −15° to +50° C., preferably 0° to 45° C., by indirect or direct cooling, for example using ice, and stirring is continued until the coupling reaction is completed, the dye is formed in the new γ-modification. This γ-modification has an X-ray diffraction diagram (Cu-Kα radiation) which has the following lines at diffraction angles 2Θ (°):

| Lines of high intensity: | 25.92, 26.81; |
|---|---|
| Lines of medium intensity: | 11.86, 12.26, 13.42, 14.91, 24.53; |
| Lines of low intensity: | 7.36, 10.50, 18.80, 19.75, 22.09, 22.94, 27.33, 27.92, 29.22, 31.13, 32.02; |

If the dye of the formula I is recrystallised from organic solvents, it is formed in the α- or β-modification or in the form of mixtures thereof, depending on the conditions chosen. However, if the organic solvent used is acetic acid, the new δ-modification is obtained, which has an X-ray diffraction diagram (Cu-Kα radiation) which has the following lines at diffraction angles 2Θ (°):

| Lines of high intensity: | 6.03, 6.55, 9.35; |
|---|---|
| Lines of medium intensity: | 10.72, 12.22, 13.26; |
| Lines of low intensity: | 22.27, 26.53, 27.37, 27.79. |

Not only the γ- but also the δ-modification can be converted into the β- modification according to the invention as described above.

The dye of the formula I in the β-modification, even in mixtures with other disperse dyes, is highly suitable for the dyeing and printing of shaped articles, such as fibres, fabrics and sheets made of synthetic or semisynthetic materials, by processes known per se for dyeing and printing using disperse dyes, in particular by the so-called HT process. It produces an orange dyeing of high colour strength and good fastness properties, in particular very good thermal migration fastness.

However, it is also highly suitable for the dyeing of articles composed of mixtures of fibres of synthetic and semisynthetic materials with cellulose fibres. This produces no/or only slight dyeing, as desired, of the cellulose portion.

In the examples which follow, parts are by weight.

EXAMPLE 1 a) 84 parts of 4-methoxy-2-nitroaniline are dissolved in 200 parts of water and 150 parts of hydrochloric acid, and then 70 parts of a 40% strength by weight sodium nitrite solution are added at −5° to +5° C. with stirring for diazotisation. After the reaction is complete, the diazonium salt solution is run into a solution of 89 parts of 1-ethyl-3-cyano-4-methyl-6-hydroxypyrid-2-one in 500 parts of water and 69 parts of 27% strength by weight sodium hydroxide solution at up to 50° C. Stirring at up to 50° C. is continued for 2 hours, the reaction mixture is heated to 80° to 95° C. and maintained at this temperature for 1 hour while stirring. The dye is then filtered off with suction while hot, which takes 23 seconds, washed with water and isolated in the form of a paste. This paste contains the dye in the β-modification and has a dry solids content of 51% by weight.

b) 10 parts by weight of the dye paste obtained in a) are milled while wet with the addition of 10 parts by weight of an anionic dispersant based on a condensation product of naphthalenesulphonic acid with formaldehyde at 20° C. until 90% of the particles are equal to or smaller than 1 μm. The milled material is dried to give a powdered formulation of the dye which completely fulfils all practical requirements during dyeing. Comparative example: (Preparation of the dye in the previously known α-modification)

a) 84 parts of 4-methoxy-2-nitroaniline are dissolved in 200 parts of water and 150 parts of hydrochloric acid, and then 70 parts of a 40% strength by weight sodium nitrite solution are added at −5° to +5° C. with stirring for diazotisation. After the reaction is complete, the diazonium salt solution is run into a solution of 89 parts of 1-ethyl-3-cyano-4-methyl-6-hydroxypyrid-2-one and one part of a naphthalene/formaldehyde condensation product in 500 parts of water and 69 parts of 27% strength by weight sodium hydroxide solution at up to 50° C. Stirring at up to 50° C. is continued for 2 hours, the dye is filtered off with suction, which takes 5 3/4 minutes, washed with water and isolated to form a paste. This paste contains the dye in the α-modification and has a dry solids content of 20% by weight.

EXAMPLE 2

10 parts of a paste containing the dye I in the α-modification (this paste is prepared in accordance with the above comparative example) are milled while wet with addition of 10 parts by weight of an anionic dispersant based on a condensation product of napthalenesulphonic acid with formaldehyde in a pearl mill at 80° C. until 90% of the particles have a size of 1 μm or smaller and complete conversion of the crystal structure into the β-modification is observed. After drying, a powdered formulation of the dye in the colour-stable β-modification is obtained, which completely fulfils all practical requirements during dyeing.

EXAMPLE 3

10 parts of polyethylene terephthalate fibres in the form of a knitted fabric are dyed at 130° C. for 1 hour under pressure in a bath containing 0.25 part of the finely dispersed dye of the formula I in the β-modification in 200 ml of water. The orange dyeing obtained is subjected to reductive aftertreatment as usual, rinsed with hot and cold water and dried and has excellent fastness properties.

EXAMPLE 4

25 parts of a polyethylene terephthalate fabric are printed with a printing paste containing 50 parts of the dye of the formula I in the β-modification, 200 parts of Nafka rubber, 50 parts of naphthol diglycol ether and 700 parts of water. After drying, the fabric is fixed at 200° C. for 30 seconds and finally subjected to a reductive aftertreatment, to give an orange-coloured print having excellent fastness properties.

We claim:

1. β-Modification of the dye of the formula I

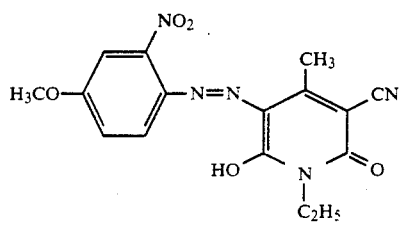

whose X-ray diffraction diagram (Cu-Kα radication) has the following lines at diffraction angles 2Θ (°):

| | |
|---|---|
| Lines of high intensity: | 11.57, 24.93, 28.09; |
| Lines of medium intensity: | 8.23, 15.52, 18.85, 20.27; |
| Lines of low intensity: | 13.99, 19.35, 21.45. |

2. Process for the preparation of the β-modification of the dye of the formula I given in claim 1, characterized in that the α-modification of the dye of the formula I is heated to temperatures from 50° to 150°.

3. Process according to claim 2, characterized in that the α-modification is heated while suspended in water.

4. Process according to claim 3, characterized in that the suspension which is formed in the synthesis of the dye by diazotisation and coupling, after the coupling reaction is complete, is used directly as aqueous suspension.

5. Process according to claim 3, characterized in that dispersants and/or emulsifiers and/or solvents are added to the suspension to be heated.

6. Process according to claim 2, characterised in that the α-modification is heated in the course of the customary conversion of the dye into a very finely divided form.

7. Dye preparation, characterized in that it contains the β-modification of the dye of the formula I given in claim 1.

8. Process of dyeing or printing shaped articles, such as fibres, fabrics and sheets made of synthetic or semi-synthetic materials or mixtures thereof with cellulose fibres with the β-modification of the dye of the formula I given in claim 1.

* * * * *